United States Patent Office 3,278,440

Patented Oct. 11, 1966

3,278,440

SHAPED FINE PARTICLE FERRITES AND METHOD FOR THEIR PREPARATION

William J. Schuele, Philadelphia, Pa., assignor to The Franklin Institute of the State of Pennsylvania, Philadelphia, Pa., a corporation of Pennsylvania No Drawing. Filed Nov. 22, 1960, Ser. No. 70,930
14 Claims. (Cl. 252—62.5)

This invention relates to novel microscopic ferrite particles with a spinel structure and to a method for producing same, and more particularly the invention relates to such ferrite particles having a size in the single-domain size range and a definite shape, and to a novel method for their production. The term "ferrite" as used in this specification and appended claims means a ferrite having a spinel crystal structure.

In order for small ferromagnetic particles to have the greatest coercive force and remnant induction, it is known that the particles should have a size generally about the same as, or not far removed from, that particle size which energy considerations have shown to be essential for the particles to be single-domain particles, i.e. particles whose magnetic moments are oriented in a single direction. In addition, it is known that the shape or configuration of the small particles has a considerable bearing on the magnetic properties of the particles, and that particles which are acicular or needle-like in configuration in most instances possess greatly enhanced magnetic properties as compared to particles of a similar composition and size which have another configuration, for example a spherical configuration.

Certain ferrites, such as cobalt ferrites and the like, are known to possess hard magnetic properties, and have been used in the formation of inexpensive magnets by dispersing the fine ferrite powders in a suitable plastic matrix.

Heretofore ferrites have been obtained by forming an intimate mixture of one or more metal oxides with iron oxide and heating the mixture to high temperatures in the range between about 1100° and 1500° C., at which temperature the oxides fuse together to form a crystalline ferrite. The resulting ferrite is magnetically soft, i.e. it loses its magnetization relatively rapidly after removal of a magnetic field employed to induce magnetization of the ferrite. However, if ferrites produced in this manner are ground to a relatively small size, the ferrite particles become magnetically hard, i.e. they have considerable remnant induction after removal of a magnetizing field. Unfortunately, methods for reducing bulk ferrites to a size in the single-domain size range have not heretofore been known.

In the above-described method for forming ferrites, the particles are generally spherical in configuration, a shape which energy considerations have shown is generally undesirable in providing the highest coercive force and remnant induction.

A primary object of this invention is to provide novel single-domain microscopic ferrite particles of definite shape having improved magnetic properties.

Still another object of this invention is to provide single-domain ferrite particles of acicular form, which are particularly useful for the manufacture of permanent magnets of greater coercive force.

A further object of the present invention is the provision of a method for obtaining microscopic ferrite particles of definite shape, which upon agglomeration yield permanent magnets of substantially improved magnetic properties.

A still further object of the present invention is to provide a method for obtaining single-domain, acicular ferrite particles which are particularly suitable for the manufacture of inexpensive permanent magnets of increased coercive force and remnant induction.

These and other objects of the present invention will become more clearly apparent from a consideration of this specification and claims.

According to this invention there is provided a method for obtaining acicular ferrite particles of a size generally the same as, or not far removed from, that particle size which energy considerations have shown to be essential for ferrite particles to be single-domain particles, which comprises precipitating a metal salt of an aliphatic acid containing from 1 to 5 carbon atoms on microscopic acicular iron oxide particles by addition of an ammonium salt of the aliphatic acid to an aqueous dispersion of the iron oxide particles in an aqueous solution of a metal salt of a strong mineral acid, the metal salt being selected from the group consisting of salts of the metals copper, strontium, barium, chromium, manganese, iron, cobalt, nickel and mixtures thereof, and mixtures of one or more of these salts with salts of the metals calcium, magnesium and zinc, separating the particles from the solution, and heating the particles to a temperature at which the metal salt of the resulting aliphatic acid decomposes.

By the method of this invention acicular ferrite particles of single-domain size are easily and inexpensively obtained, and the particles have excellent magnetic properties in terms of coercive force and remnant induction due to their configuration and size. It was surprising to find that the particles do not merely comprise ferric oxide with a shell of ferrite, but rather are composed entirely of ferrite. Apparently during heating of the iron oxide particles, upon which a metal salt of an aliphatic acid has been precipitated in the foregoing manner, to a temperature at which decomposition of the salt takes place, the metal ion from the salt diffuses entirely through the iron oxide particles and combines therewith to form the crystalline ferrite. This fact has been borne out by means of X-ray studies of the particles and by the unexpectedly high coercive force possessed by the particles. Because the metal salts of the aliphatic acids have relatively low decomposition temperatures, generally not exceeding about 600° C., the resulting ferrite particles are not sintered together in the form of undesirable agglomerates, or particles of a size substantially greater than single-domain size; neither do the particles lose their desirable acicular form.

Microscopic, acicular iron oxide particles which may be employed in the production of ferrites according to the method of this invention are readily available in the form of commercial pigments, or can be prepared by various well known processes. One well known method for preparing the iron oxide particles involves depositing iron oxide onto minute seed particles from an iron salt solution. The seed material upon which the iron oxide is deposited may comprise a sol produced by adding ammonium hyhydroxide to ferric chloride to form a rich, red sol and dialyzing the sol until the quantity of free chlorine ($Cl^-$) and ferric iron ($Fe^{+++}$) ions present is negligible. Iron oxide hydrate is then precipitated on the small seed particles of the sol by dispersing the sol in a solution of a ferrous salt, such as ferrous sulfate, and by bubbling an oxygen-containing gas through the solution of ferrous salt. To keep the reaction continuous, metallic iron is added to the solution. This method of forming acicular iron oxide hydrate particles is discussed in detail in United States Patent No. 2,879,154. Another suitable method of forming iron oxide particles for use in accordance with the method of this invention is disclosed in British patent specification No. 665,554.

Since the ultimate size of the ferrite particles which are obtained by the method of this invention is dependent, to a large degree, on the size of the iron oxide particles, it is essential that the method for producing the iron oxide particles be so controlled as to produce particles of the desired size. These methods of forming shaped iron oxide particles can be controlled to produce particles ordinarily having a length of from about 300 A. to about 10,000 A., a width of from about 150 A. to about 5000 A., and a length to width ratio between about 2:1 and 40:1.

The iron oxide particles of the desired size produced as above, or by other methods well known in the art, or otherwise obtained, are dispersed in an aqueous solution of a salt of the metal which is to be combined with the iron oxide to form the ferrite. Since the iron oxide particles, even though extremely small, tend to precipitate out of solution, it is desirable to add to the solution a small amount of an inorganic or organic dispersing agent in order to obtain a stable dispersion of the particles. A useful inorganic dispersing agent is a water-soluble polyphosphate, such as sodium hexametaphosphate having a molecular ratio of 1.1 $Na_2O$:1 $P_2O_5$, and a minimum of 67% $P_2O_5$. When such a polyphosphate is added to an aqueous slurry of finely divided iron oxide particles adsorption takes place, and the absorbed ions produce an electrostatic charge on the particles which causes the particles to repel one another. The increase of electrostatic charge results in a very pronounced increase in the stability of the dispersion of the particles. Ordinarily between about 0.2 and 1.5% of the polyphosphate, based on the dry weight of the iron oxide particles, is sufficient to obtain a relatively stable dispersion of the iron oxide particles. Another suitable inorganic dispersing agent is sodium silicate; however, polyphosphates are preferred inorganic agents for this purpose.

Various organic surface active agents, particularly of the nonionic type, such as alkyl aryl polyoxyethylene compounds, such as para-$C_8H_{17}C_6H_4(OCH_2CH_2)_nOH$ ($C_8H_{17}$=diisobutyl $(CH_3)_2CCH_2C(CH_3)_2$—) may be used to form stable dispersions of the iron oxide particles. As little as 2% of such organic surface active agents, based on dry weight of iron oxide particles, is ordinarily sufficient to obtain such result.

In obtaining the desired dispersions it is frequently desirable to use high shear equipment. In the laboratory, a Waring Blendor is a convenient high shear unit. For commercial plant use, a high shear unit such as a close clearance colloid mill, homogenizing mill, or high shear agitating mill may be used.

The metal salts employed in forming aqueous solutions in which the iron oxide particles are dispersed according to the method of this invention preferably are salts of strong mineral acids, such as hydrochloric, sulfuric and nitric acids. Typical of such salts are the chlorides, sulfates and nitrates of the metals copper, strontium, barium, chromium, manganese iron, cobalt and nickel, for example copper chloride, copper sulfate, copper nitrate, chromous chloride, chromous sulfate, manganous chloride, manganous nitrate, manganous sulfate, ferrous chloride, ferrous nitrate, ferrous sulfate, nickel chloride, nickel nitrate and nickel sulfate. As stated previously, mixtures of these salts, or mixtures of one or more of these salts with the chlorides, nitrates and sulfates of calcium, magnesium and zinc may be used.

The amount of the metal salt of the strong mineral acid employed is determined by the composition of the ultimate ferrite which is desired It was found that according to the method of this invention substantially all of the metal provided by the solution of the metal salt of the strong mineral acid is uniformly deposited as regards the iron oxide particles present in the solution, i.e. the amount of metal, in the form of a metal salt of a low molecular weight, aliphatic acid, which is deposited on each of the particles is essentially the same. Furthermore, the molar ratio of the metal to iron oxide in the ultimate ferrite is directly proportional to the molar ratio of the metal salt of a strong mineral acid to the iron oxide particles in the dispersion, provided the precipitation is carried to completion as hereinafter discussed. In other words, by employing one mol of a metal salt of a strong mineral acid for each mol of iron oxide particles dispersed in the solution, one may obtain a ferrite in which there is one mol of metal combined with each mol of iron oxide. For example, if it desired to form ferrite particles of the composition $CuFe_2O_4$, it is merely necessary to use about one mol of a copper salt of a mineral acid, such as copper chloride, for each mol of iron oxide particles dispersed in the solution of the copper chloride. On the other hand, if a lesser molar ratio of metal to iron oxide in the ferrite is desired, a proportionately smaller molar quantity of the metallic salt of the mineral acid per mol of iron oxide particles is used. Also, by employing a mixture of metallic salts of the mineral acids one may obtain ferrites containing a combination of metals in proportion to the molar ratio in the salt solution. Thus, if is is desired to produce a cobalt magnesium ferrite ($Co_{0.5}Mg_{0.5}Fe_2O_4$) in which there is half a mol of cobalt and half a mol of magnesium for each mol of iron oxide, all that is required is to form a solution of the metal salts in which there is half a mol of each of these salts for each mol of iron oxide particles.

From the foregoing it can be seen that the magnetic ferrites which may be produced by the method of this invention, which ferrites are crystalline spinels, may be represented generally by the following formula:

$$M''Fe_2O_4$$

in which M'' may be copper, strontium, barium, divalent chromium, divalent manganese, divalent iron, divalent cobalt, divalent nickel, and mixtures of these metals. In addition M'' may represent any one or more of the foregoing metals along with magnesium, calcium or zinc. Representative ferrites include among others:

| | |
|---|---|
| $CuFe_2O_4$ | $MnFe_2O_4$ |
| $SrFe_2O_4$ | $Fe_3O_4$ |
| $BaFe_2O_4$ | $CoFe_2O_4$ |
| $CrFe_2O_4$ | $NiFe_2O_4$ |

Each of the above ferrites possess magnetic properties, whereas ferrites such as $MgFe_2O_4$ and $CaFe_2O_4$ are not known to have magnetic properties. However, the metals magnesium and calcium can be used in making ferrites possessing magnetic properties, provided that in addition to these metals another metal which provides a magnetic ferrite is present. Typical magnetic ferrites containing the metals magnesium and calcium are cobalt magnesium ferrite ($Co_{0.5}Mg_{0.5}Fe_2O_4$) and nickel calcium ferrite $$(Ni_{0.5}Ca_{0.5}Fe_2O_4)$$

As stated above, the molar ratio of metal to iron oxide in the ferrite particles may vary widely. For example, in a cobalt magnesium ferrite there may be 0.25 mol of cobalt and 0.75 mol of magnesium per mol of iron oxide ($Fe_2O_3$) rather than half a mol of each of these two metals. Similarly the ferrite may contain only a fraction of a mol of a single metal per mol of iron oxide, or somewhat more than one mol of a metal or mixtures of metals for each mol of iron oxide. Because of these wide variations, the formula $M''Fe_2O_4$ is not an exact formula, it not being possible to set forth a formula covering all possible variations. However, most of the ferrites produced according to this invention will contain from about 0.9 to about 1.1 mols of metal or mixtures of metals of the types described above for each mol of iron oxide ($Fe_2O_3$).

The ferrites of this invention will have a particle size and configuration which is essentially similar to that of the iron oxide particles from which they are obtained. Thus, these acicular ferrites will ordinarily have a length of from about 300 A. to about 10,000 A., a width of about 150 A. to about 5000 A., and a length to width ratio between about 2:1 and about 40:1.

In order to precipitate the desired metal component of the ferrite on the iron oxide particles, there is added to the aqueous dispersion an ammonium salt of a lower aliphatic, carboxylic acid containing from 1 to 5 carbon atoms. Typical of such salts are ammonium formate, ammonium acetate, ammonium propionate, ammonium butyrate, ammonium oxalate, ammonium succinate and ammonium valerate. The amount of ammonium salt employed should be sufficient to react with all of the salt of the strong mineral acid so as to precipitate as a metal salt of the aliphatic carboxylic acid all of the metal ions available from the solution. Thus, if a mol of metal salt is present and all of the metal ions of the salt are to be precipitated, a mol of the ammonium salt should be used. A slight excess of ammonium salt over equimolecular proportions to the metal salt preferably is employed.

The advantage in using ammonium salts of organic acids as the precipitating agent resides in the fact that the resulting metal salts of the aliphatic carboxylic acids are relatively insoluble, and in formation of the ferrite on subsequent heating to decompose the metal salt of the aliphatic carboxylic acid precipitated on the iron oxide particles, the ammonium ions are decomposed to gaseous materials and are thereby removed from the ferrites. On the other hand, if metal salts of the aliphatic carboxylic acids, such as sodium acetate, were used as precipitating agents, these metals would be present in varying amounts in the resulting ferrites and would adversely affect the desired magnetic properties of the ferrites.

The temperature of the solution in which the iron oxide particles is dispersed is not critical although it should be sufficiently high to permit solution of the ammonium salt of the lower molecular weight aliphatic carboxylic acid which is used as the precipitating agent. For example, ammonium oxalate does not dissolve too readily at room temperature, but dissolves quite rapidly at somewhat elevated temperatures in the range between about 50° and 80° C. Selection of a proper temperature presents no problem, and can be readily determined by a person skilled in the art with a knowledge of the solubility characteristics of a particular precipitating agent employed.

Precipitation of the metal salt of the aliphatic carboxylic acid on the iron oxide particles ordinarily takes place in a relatively short period of time, and generally precipitation is completed in a matter of a few minutes. Depending upon the particular metal salt of a mineral acid which is used, completion of the precipitation can frequently be determined by a change in color of the solution in which the iron oxide particles are dispersed. Determining when precipitation is completed will present no problem to a skilled chemist.

After precipitation of the metal salt of an aliphatic carboxylic acid on the iron oxide particles has been completed, the iron oxide particles may be separated from the aqueous solution in any well known manner, as for example by filtration or centrifugation. After particles have thus been separated, they are preferably dried prior to being heated to decompose the precipitate. Drying can be effected by means of air dryers, or by use of organic solvents such as acetone or ether.

After the particles have been dried, they are heated to a temperature which is sufficiently high to decompose the metal salt of the aliphatic carboxylic acid. The temperature which is employed, of course, will depend upon the particular salt which is precipitated on the iron oxide particles. Decomposition temperatures for the various salts which are formed as precipitates on the particles according to the method of this invention may be obtained from various publications, and a skilled chemist will have no difficulty in determining the temperature that should be used. For example, nickel oxalate decomposes at a temperature of about 400° C. Thus, if it is desired to form a nickel ferrite the ferric oxide particles having a precipitate of nickel oxalate thereon should be heated to this temperature or somewhat higher. Although the temperature employed should be sufficiently high to decompose the precipitate, no advantage is to be gained by using temperatures substantially above the decomposition temperature. In fact, the use of temperatures substantially above the decomposition temperature should be avoided in order to insure that the particles retain their acicular shape. As pointed out previously, one particular advantage of the present invention is the fact that the ferrites can be formed at relatively low temperatures at which they do not lose their acicular shape whereas in the prior processes substantially higher temperatures had to be employed resulting in the formation of agglomerates of particles of a generally spherical configuration.

The ferrites produced according to this invention, because of their advantageous magnetic properties, are particularly useful in the formation of inexpensive permanent magnets. In forming such magnets the ferrite particles may be dispersed in a suitable synthetic resin, for example thermoplastic resins, such as acrylic resins and thermosetting resins such as phenol aldehyde resins.

The following examples further illustrate the advantages of this invention but are not intended to limit the scope of this invention.

*Example I*

50 g. of $\alpha$-$Fe_2O_3$ having an average length of 10,000 A. and an average width of 2000 A. was stirred in a Waring Blendor in a nickel chloride solution so that there was 1 mol of nickel chloride for each mol of iron oxide particles. In order to stabilize the resulting dispersion of iron oxide particles there was incorporated in the nickel chloride solution 0.5% of sodium hexametaphosphate, based on the dry weight of the iron oxide particles.

Sufficient ammonium oxalate was added to the resulting suspension in order to precipitate the nickel oxalate on the iron oxide particles to provide 1 mol of nickel oxalate for each mol of iron oxide present. The product obtained by precipitating nickel oxalate on the iron oxide particles was filtered on a Büchner funnel and dried.

A portion of the particles thus produced was heated at 400° C. for 3 hours and nickel ferrite was obtained having the approximate formula $NiFe_2O_4$. The nickel ferrite particles have an average length of 10,000 A. and an average width of 2000 A.

A portion of the ferrite particles, obtained as above, were packed into a glass tube with Duco cement, and the glass tube was placed between opposing poles of a generally U-shaped electromagnet. The glass tube was surrounded by a pickup coil which was connected to a hysteresisgraph, by means of which a hysteresis loop was directly obtained by varying the intensity of the magnetic field in which the sample was placed. From the hysteresis loop thus obtained, it was determined that the nickel ferrite particles have a coercive force of 205 oersteds and a ratio of remanence to saturation of .447.

*Example II*

Another portion of the nickel oxalate coated iron oxide particles prepared according to the manner of Example I was heated to a temperature of 420° C. for a period of 16 hours, and the resulting ferrite particles were tested for magnetic properties in the manner described in Example I. The nickel ferrite particles, which have an average length of 10,000 A. and an average width of 2000 A., were found to have a coercive force of 208 oersteds and a remanent induction of 0.440.

*Example III*

The procedure of Example I was repeated with the exception that cobalt chloride was used in place of nickel chloride, and the temperature to which the iron oxide particles on which cobalt oxalate was precipitated were heated was 500° C. for 4 hours. The resulting cobalt ferrite ($CoFe_2O_4$) had a coercive force of 2960 oersteds and a ratio of remanence to saturation of 0.596.

*Example IV*

One mol of $\alpha$-$Fe_2O_3$ having an average length of 10,000 A. and an average width of 2000 A. is stirred in a Waring Blendor in an aqueous solution containing .2 mol of magnesium chloride and .7 mol of nickel chloride. In order to stabilize the resulting dispersion of iron oxide particles there is incorporated in the solution 0.5% of sodium hexametaphosphate, based on the dry weight of iron oxide particles.

Sufficient ammonium propionate is added to the resulting suspension in order to precipitate on the iron oxide particles substantially all of the magnesium and nickel ions as a mixture of magnesium and nickel propionates. The product obtained is filtered on a Büchner funnel and dried.

A portion of the particles thus prepared is heated at about 500° C. for about 5 hours and a magnesium nickel ferrite of the approximate formula $Mg_{0.2}Ni_{0.7}Fe_2O_4$ is produced.

A portion of the ferrite particles is tested for magnetic properties in the manner described in Example I.

Mention has been made hereinabove to the use of the novel acicular ferrites of this invention in permanent magnets. A particularly advantageous ferrite for this purpose is a cobalt ferrite. In addition, they find use in permanent magnets, the ferrites of this invention may be used in recording devices (sound and video), as for example in magnetic tapes for such devices. The nickel ferrites are particularly useful for such purposes. The ferrites of this invention may be used for many other purposes which will be apparent to skilled technicians.

What is claimed is:

1. A method for producing acicular ferrite particles in the single-domain size range which comprises, precipitating a metal salt of an aliphatic carboxylic acid containing from 1 to 5 carbon atoms on microscopic acicular iron oxide particles having a particle size within the single domain size range by addition of an ammonium salt of said aliphatic carboxylic acid to a dispersion of said iron oxide particles in an aqueous solution of a metal salt of a strong mineral acid, said aqueous solution being at a temperature at which said ammonium salt is soluble therein, said metal salt being selected from the group consisting of salts of the metals copper, strontium, barium, divalent chromium, divalent manganese, divalent iron, divalent cobalt, divalent nickel and mixtures thereof, and mixtures of at least one of said salts with a metal salt of a strong mineral acid in which the metal is selected from the group consisting of calcium, magnesium, and zinc, separating the particles from the solution, and heating said particles to an elevated temperature at which said metal salt of said aliphatic carboxylic acid decomposes to the corresponding oxide but below the temperature at which said particles lose their acicular shape to decompose said metal salt of said aliphatic carboxylic acid and form said ferrite.

2. The method according to claim 1 in which from about 0.9 to about 1.1 mols of said metal salt of said strong mineral acid are used for each mol of iron oxide particles.

3. The method according to claim 1 in which said metal salt of a strong mineral acid comprises a chloride.

4. The method according to claim 3 in which said metal salt of a strong mineral acid comprises nickelous chloride.

5. The method according to claim 3 in which said metal salt of a strong mineral acid comprises cobalt chloride.

6. The method according to claim 1 in which the ammonium salt of a lower aliphatic carboxylic acid comprises ammonium oxalate.

7. The method according to claim 6 in which said aqueous solution of a metal salt of a strong mineral acid is at a temperature in the range between about 50° C. and about 80° C. during addition of said ammonium oxalate.

8. A method for producing acicular ferrite particles in the single-domain size range which comprises, precipitating a metal salt of an aliphatic carboxylic acid containing from 1 to 5 carbon atoms on acicular iron particles having a length of from about 300 A. to about 10,000 A., a width of from about 150 A. to about 5000 A., and a length to width ratio of from about 2:1 to about 40:1 by addition of an ammonium salt of said aliphatic carboxylic acid to a dispersion of said iron oxide particles in an aqueous solution of a metal salt of a strong mineral acid, said aqueous solution being at a temperature at which said ammonium salt is soluble therein, said metal salt being selected from the group consisting of salts of the metals copper, strontium, barium, divalent chromium, divalent manganese, divalent iron, divalent cobalt, divalent nickel and mixtures thereof, and mixtures of at least one of said salts with a metal salt of a strong mineral acid in which the metal is selected from the group consisting of calcium, magnesium and zinc, separating the particles from the solution, and heating said particles to an elevated temperature at which said metal salt of said aliphatic carboxylic acid decomposes to the corresponding oxide but below the temperature at which said particles lose their acicular shape to decompose said metal salt of said aliphatic carboxylic acid and form said ferrite.

9. The method according to claim 8 in which said metal salt of a strong mineral acid comprises a chloride.

10. The method according to claim 9 in which said metal salt of a strong mineral acid comprises nickelous chloride.

11. The method according to claim 9 in which said metal salt of a strong mineral acid comprises cobalt chloride.

12. The method according to claim 8 in which the ammonium salt of a lower aliphatic carboxylic acid comprises ammonium oxalate.

13. The method according to claim 12 in which said aqueous solution of a metal salt of a strong mineral acid is at a temperature of in the range between about 50° C. and about 80° C. during addition of said ammonium oxalate.

14. The method according to claim 8 in which from about 0.9 to about 1.1 mols of said metal salt of said strong mineral acid are used for each mol of iron oxide particles.

References Cited by the Examiner

UNITED STATES PATENTS 3,047,429 7/1962 Stoller et al. -------- 252—62.5

OTHER REFERENCES

Berkowitz et al.: Magnetic Properties, etc., J. Applied Physics, Supp. to vol. 30, No. 4, April 1959, pages 134S–135S. (Copy in Sci. Lib.)

TOBIAS E. LEVOW, *Primary Examiner.*

JOSEPH R. LIBERMAN, JULIUS GREENWALD, MAURICE A. BRINDISI, *Examiners.*

S. R. BRESCH, R. D. EDMONDS, *Assistant Examiners.*